United States Patent
Hagedoorn (10) Patent No.: US 7,505,369 B2
(45) Date of Patent: Mar. 17, 2009

(54) GEOPHONE WITH MASS POSITION SENSING

(75) Inventor: Arend L. Hagedoorn, Voorschoten (NL)

(73) Assignee: Input/Output, Inc., Houston, TX (US)

( * ) Notice: Subject to any disclaimer, the term of this patent is extended or adjusted under 35 U.S.C. 154(b) by 80 days.

(21) Appl. No.: 11/618,355

(22) Filed: Dec. 29, 2006

(65) Prior Publication Data

US 2007/0223314 A1 Sep. 27, 2007

Related U.S. Application Data

(60) Provisional application No. 60/755,026, filed on Dec. 30, 2005.

(51) Int. Cl.
*G01V 1/18* (2006.01)
(52) U.S. Cl. ...................... 367/183; 367/178
(58) Field of Classification Search ......... 367/181–183, 367/185, 187
See application file for complete search history.

(56) References Cited

U.S. PATENT DOCUMENTS

| | | | |
|---|---|---|---|
| 4,504,932 A | | 3/1985 | Sundt |
| 4,555,946 A | | 12/1985 | Capaldi et al. |
| 4,584,885 A | | 4/1986 | Cadwell |
| 4,623,991 A | | 11/1986 | Vitringa |
| 4,685,094 A | | 8/1987 | Vitringa et al. |
| 4,758,821 A | * | 7/1988 | Nelson et al. ............... 341/157 |
| 4,905,517 A | * | 3/1990 | Crowe et al. .................. 73/654 |
| 5,172,345 A | | 12/1992 | van der Poel |
| 6,382,246 B2 | * | 5/2002 | Mori et al. ................... 137/554 |
| 7,331,229 B2 | * | 2/2008 | Campbell et al. ......... 73/514.32 |
| 2005/0068851 A1 | | 3/2005 | Schleisiek et al. |
| 2007/0223314 A1 | * | 9/2007 | Hagedoorn .................. 367/183 |
| 2008/0001597 A1 | * | 1/2008 | Hagedoorn ............ 324/207.13 |

FOREIGN PATENT DOCUMENTS

WO WO 2007079416 A2 * 7/2007

OTHER PUBLICATIONS

Barzilai, Aaron et al., "Improving the Performance of Geophone through Capacitive Position Sensing and Feedback," ASME International Congress Winter '98.
Usher, M.J. et al., "The design of miniature wideband seismometers," Geophys. J. R. astr. Soc., 1978, vol. 55; pp. 605-613.
Yin, Z. et al., "A high-resolution wideband digital feedback system for seismometers," J. Phys. E: Sci. Instrum., 1988, vol. 21; pp. 748-752.
PCT Notification of Transmittal of the International Search Report and the Written Opinion of the International Searching Authority, or the Declaration, May 21, 2008.

\* cited by examiner

*Primary Examiner*—Dan Pihulic
(74) *Attorney, Agent, or Firm*—Wong, Cabello, Lutsch, Rutherford & Brucculeri, LLP (57) ABSTRACT

A motion sensing element with position sensing includes a case, a magnet positioned within the case, a spring assembly having an electrically conductive member and a coil assembly coupled to the spring assembly. The coil assembly and magnet are moveable with respect to one another. A capacitor plate is proximate the electrically conductive member with a distance between the capacitor plate and electrically conductive member being variable as the magnet and coil assembly move. Leads connect the capacitor plate and electrically conductive member to a sensing circuit for estimating the relative positions of the magnet and coil assembly.

14 Claims, 9 Drawing Sheets

GEOPHONE WITH MASS POSITION SENSING

CROSS REFERENCE TO RELATED APPLICATIONS

This application is related to, and claims priority from, U.S. Provisional Patent Application Ser. No. 60/755,026 filed on Dec. 30, 2005 and titled Geophone with Mass Position Sensing, the entire specification of which is hereby incorporated herein by reference.

BACKGROUND

1. Technical Field

The present disclosure generally relates to motion sensing elements and more particularly to geophone sensing elements.

2. Background Information

Geophones are used to sense motion in the earth. Geophones normally include a spring-mass sensing element to sense motion by suspending an inertial reference mass structure from a rigid, fixed supporting structure. Typically, the fixed supporting structure comprises an outer casing and a magnet, which is fixed inside the outer casing. This rigid, fixed supporting structure is typically fastened to the medium of which movement is to be measured using a housing structure including, for example, a spike. Typically, the sensing element reference mass is a coil assembly comprising a coil wound on a coilform and suspended by springs in a magnetic field, one spring being attached at each end of the coilform. The springs position the coil within the magnetic field so that the coil is centered laterally and along its axis within the magnetic field. The springs also form a suspension system having a predetermined resonant frequency. In general, the suspension system has a much lower resonant frequency in the direction along the main axis of the geophone sensing element than in the directions perpendicular to the main axis. The lower limit of the geophone sensing element frequency band is related to the resonant frequency along the main axis, and the upper limit of the geophone sensing element frequency band is related to the resonant frequency perpendicular to the main axis. Geophones are most useful when used within these upper and lower limit frequencies. Lowering the spring stiffness along the main axis reduces the resonant frequency in the direction along the main axis thereby widening the geophone useful frequency band. Many articles and skilled artisans use the term geophone synonymously with the coil-mass sensing element. The present disclosure is directed to the sensing element structure, although the term geophone may be used from time to time. The sensing element, however, may be used in movement sensing, vibration sensing and acceleration sensing in non-geophysical prospecting applications. Therefore, the term geophone is used merely for illustrative purposes and does not limit the scope of the present disclosure to geophysical applications.

In seismic operations, seismic waves are imparted into the earth's crust, and portions of those seismic waves are reflected or refracted from the boundaries of subsurface layers. Geophones are acoustically coupled to the earth, and when the reflected or refracted waves encounter a geophone, the coil assembly of the geophone sensing element, which coil assembly is suspended between the two springs, tends to stand still while the geophone housing and its connected magnetic circuit moves with the earth's surface. The movement of the coil assembly through a magnetic field causes a voltage to be generated at the output of the geophone. The output of the geophone or an array of geophones is recorded in a form which permits analysis. Skilled interpreters can discern from the analysis the shape of subsurface formations, and the likelihood of finding an accumulation of minerals, such as oil and gas.

In present day geophone sensing elements, spider springs are used extensively. Such springs are usually made from discs of spring material and have an inner ring and an outer ring which are connected by a plurality of legs. The legs are formed by etching or stamping the spring material in accordance with a predetermined pattern. Generally three such legs are used, and the three-legged arrangement is generally considered the most advantageous.

The legs of the springs generally have a rectangular cross-section, and are curved along their lengths between the junctures with the inner and outer rings of the spring. After etching, the spring may be "preformed" according to known techniques for geophones intended for use in a vertical orientation. When preforming is complete, the inner ring is offset or displaced relative to the outer ring, such that when a mass is suspended between two such springs, the inner ring, legs, and outer ring of each spring lie in the same plane, and the coil is centered in the magnetic field.

Sometimes a coil may be displaced such that it is not centered within the magnetic field. This displacement generally reduces the effectiveness and quality of the geophone. Such displacement may result from a change in the component of gravity along the main axis when the geophone is positioned in an orientation for which it was not designed. Such displacement may also result from movement of the body to which the geophone is connected. The effect of displacement is exacerbated when the spring stiffness along the main axis is lowered. Consequently, performing and spring stiffness impose practical limits on the width of a geophone useful frequency band.

Geophones have been proposed wherein a displacement sensor is used to determine the relative position of the inertial mass with respect to the support structure. Knowing the displacement of the mass is useful in determining gravity effect on the geophone, to determine whether the geophone is planted properly, and the information can be used in a circuit for providing force-balance feedback to the geophone. Displacement sensors are typically capacitive sensors, where one capacitor electrode is coupled to the inertial mass and a second capacitor electrode is coupled to and stationary with respect to the support structure. As the mass is displaced from an initial position, the distance between the capacitor electrode changes thereby changing the capacitance. The change in capacitance as measured and the measured change is used to determine the displacement of the inertial mass.

Attempts to provide inertial mass displacement sensing have heretofore proven difficult to implement in the manufacturing process for geophones due to the small size of today's geophone sensing element and the effect on sensitivity.

SUMMARY

The following presents a general summary of several aspects of the disclosure and is not an extensive overview of the disclosure. It is not intended to identify key or critical elements of the disclosure or to delineate the scope of the claims. The following summary merely presents some concepts of the disclosure in a general form as a prelude to the more detailed description that follows.

The present disclosure provides a sensing element having a case with a magnet positioned within the case. A spring assembly including an electrically conductive member is coupled to a coil assembly, the coil assembly and magnet being moveable with respect to one another via the spring assembly. A capacitor plate is disposed proximate the electrically conductive member and separated therefrom by a distance, the distance being variable by respective movement of the magnet and the coil assembly, the capacitor plate and electrically conductive member being each adapted for electrical connection to a sensing circuit for sensing an electrical capacitance formed by the capacitor plate and the electrically conductive member, the electrical capacitance being useful in estimating a position of the coil assembly with respect to the magnet.

In another aspect, all or a portion of the coil assembly is electrically coupled to the electrically conductive member for increasing an effective surface area of the electrically conductive member.

Another aspect provides an extended capacity plate electrically coupled to the electrically conductive member for increasing an effective surface area of the electrically conductive member.

Another aspect includes a pair of stationary capacitor plates with a moveable capacitor plate positioned between the stationary plates.

In another aspect, a housing top endplate includes a first stationary capacitor plate and a bottom housing endplate includes a second stationary capacitor plate. Respective top and bottom spring assemblies form moving electrodes.

A method disclosed provides estimating a position of a sensing element inertial mass by sensing a capacitance formed by a capacitor plate and a spring assembly electrically conductive member. The method may further include sensing a first variable capacitance and a second variable capacitance. The first variable capacitance may be formed by a first capacitor plate and a side of a single moveable plate, while the second variable capacitance is formed by a second capacitor plate and a bottom side of the single moveable plate. The first variable capacitance may be formed by a first capacitor plate positioned on a top housing endplate and an electrically conductive portion of a top spring, while the second variable capacitance is formed by a second capacitor plate positioned on a housing bottom endplate and a bottom spring.

In another aspect, a variable capacitor may be formed by capacitor ring plates that move with respect to one another to vary an overlapping area between the plates. One plate may be disposed on a coil assembly, while a second plate may be formed on either or both of an inner surface of a case or an outer surface of a magnet pole piece.

BRIEF DESCRIPTION OF THE DRAWINGS

For detailed understanding of the present disclosure, reference should be made to the following detailed description of the preferred embodiment, taken in conjunction with the accompanying drawings, in which like elements have been given like numerals and wherein.

DESCRIPTION OF EXEMPLARY EMBODIMENTS

Figure 1:
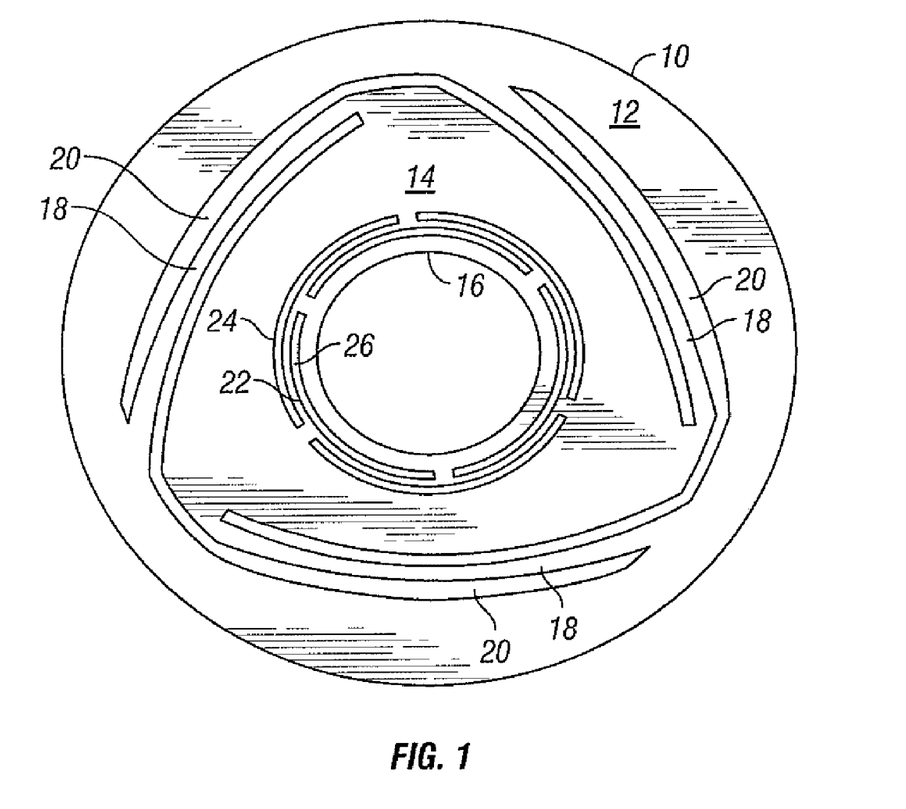
FIG. 1 is a non-limiting example of a sensor spring, which may be used in several sensing element examples of the present disclosure.

FIG. 1 is a non-limiting example of a sensor spring, which may be used in several sensing element examples of the present disclosure. The spring 10 may be manufactured using a thin, disc-shaped material such as beryllium copper.

The spring 10 comprises an outer spring which in turn has an outer ring member 12, a middle ring member 14, and an inner ring member 16. The outer ring member 12 and the middle ring member 14 are connected by a plurality of legs 18, which are formed by removing those portions of the disc designated 20. Preferably, this removal is effected by known etching techniques. The combination of the outer ring member 12, the middle ring member 14, and the legs 18 constitutes a first suspension means.

Still referring to FIG. 1, the spring 10 includes an inner spring which is formed between the middle ring member 14 and the inner ring member 16. The middle ring member 14 and the inner ring member 16 are connected by arms 22. The combination of the middle ring member 14, the inner ring member 16, and the arms 22 constitutes a second suspension means. The arms 22 are formed by removing those concentric portions of the disc designated 24, 26, and that removal can be done by etching or stamping. The inner spring can be stamped or etched in any spring configuration, and is shown incorporated into a delta-shaped geophone spring 10 for the purpose of illustration.

As noted above, the configuration and number of the etchings to form the inner spring may be varied as desired or required. The spring described above and shown in FIG. 1 is substantially as described in U.S. Pat. No. 4,685,094 to Vitringa et al. for "Lateral Compliance Device for Geophone Springs". The lateral compliance device, the second suspension means 16, 22 may be used in the exemplary sensing elements disclosed herein but are not required. Furthermore, the particular shape of the middle ring member 14 need not be delta-shaped as shown here. Consequently, any substantially flat spring 10, whether preformed or not, may be used in the several embodiments of the present disclosure using a spring as part of a position sensing circuit as will be described in further detail later. Note also that some embodiments do not use a spring as part of the sensing circuit.

Figure 2:
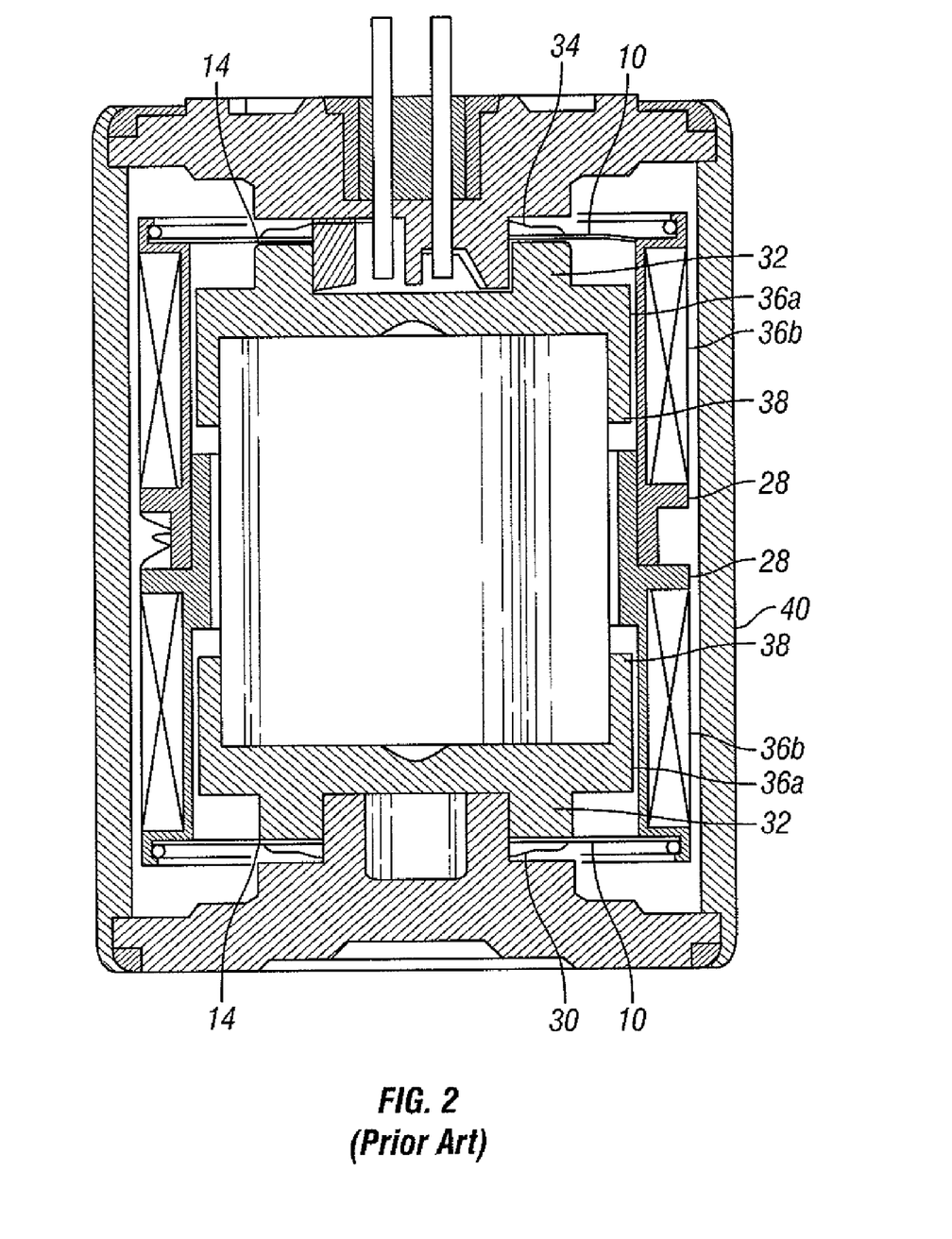
FIG. 2 illustrates a typical coil-magnet geophone sensing element.

FIG. 2 illustrates a typical coil-magnet geophone sensing element. Referring to FIG. 2, a known geophone sensing element has two springs 10, one on the top and one on the bottom of a coil assembly 28. When installed in a geophone, each spring 10 supports approximately one-half the weight of the coil assembly 28 and each spring 10 is substantially flat when the coil assembly 28 is in a normal operational orientation or rest position. As the spring 10 supports the coil assembly 28, for axial movement it also centers the coil assembly 28 along the vertical or main axis of the geophone.

When the spring 10 is installed on the bottom of the coil assembly, a pressure ring member, herein called a pressure ring 30 pushes the middle ring member 14 (shown also in FIG. 1) against the flat surface of a pole piece member, herein called a pole piece shoulder 32. The frictional effect of the flat surface of the middle ring member 14 being held against the flat surface of the pole piece shoulder 32 dampens any lateral resonances that could be produced during normal operation. That is, the combination of the pressure ring 30 and the pole piece shoulder 32 provides for damping the lateral movement of the inner spring.

When a second spring 10 is installed on the top of the coil assembly, a contact ring 34 pushes the middle ring member 14 against the flat surface of a pole piece shoulder 32. The same frictional effect described above also operates with the second spring 10 on the top of the coil assembly. That is, the combination of the contact ring 34 and the pole piece shoulder 32 provides for damping the lateral movement of the inner spring.

During rough handling or destruction tests, flexible arms, for example arms 22 described above and shown in FIG. 1, will flex to allow the coil assembly 28 to hit its lateral stops. The coil assembly 28 has a gap 36 on either side. To the left of the gap 36a is a pole piece 38. To the right of the gap 36b is a case 40, which may also be referred to herein as a housing. Both the inner spring and the outer spring of the spring 10 center the coil assembly 28 laterally between the pole piece 38 and the case or housing 40. The pole piece 38 and the case 40 are the lateral stops which stop the lateral motion of the coil assembly 28.

The legs 18 may be too stiff by themselves to allow sufficient lateral movement and, therefore, they may absorb the shock to their detriment if the lateral compliance device is not added. Since the arms 22 flex to allow the coil assembly 28 to hit both the pole piece 38 and the case 40, the legs 18 do not have to absorb the shocks. This extends the useful life of the legs 18, and thus of the spring 10. As noted above, the second suspension means 16, 22 is/are optional for the examples herein.

Figure 3:
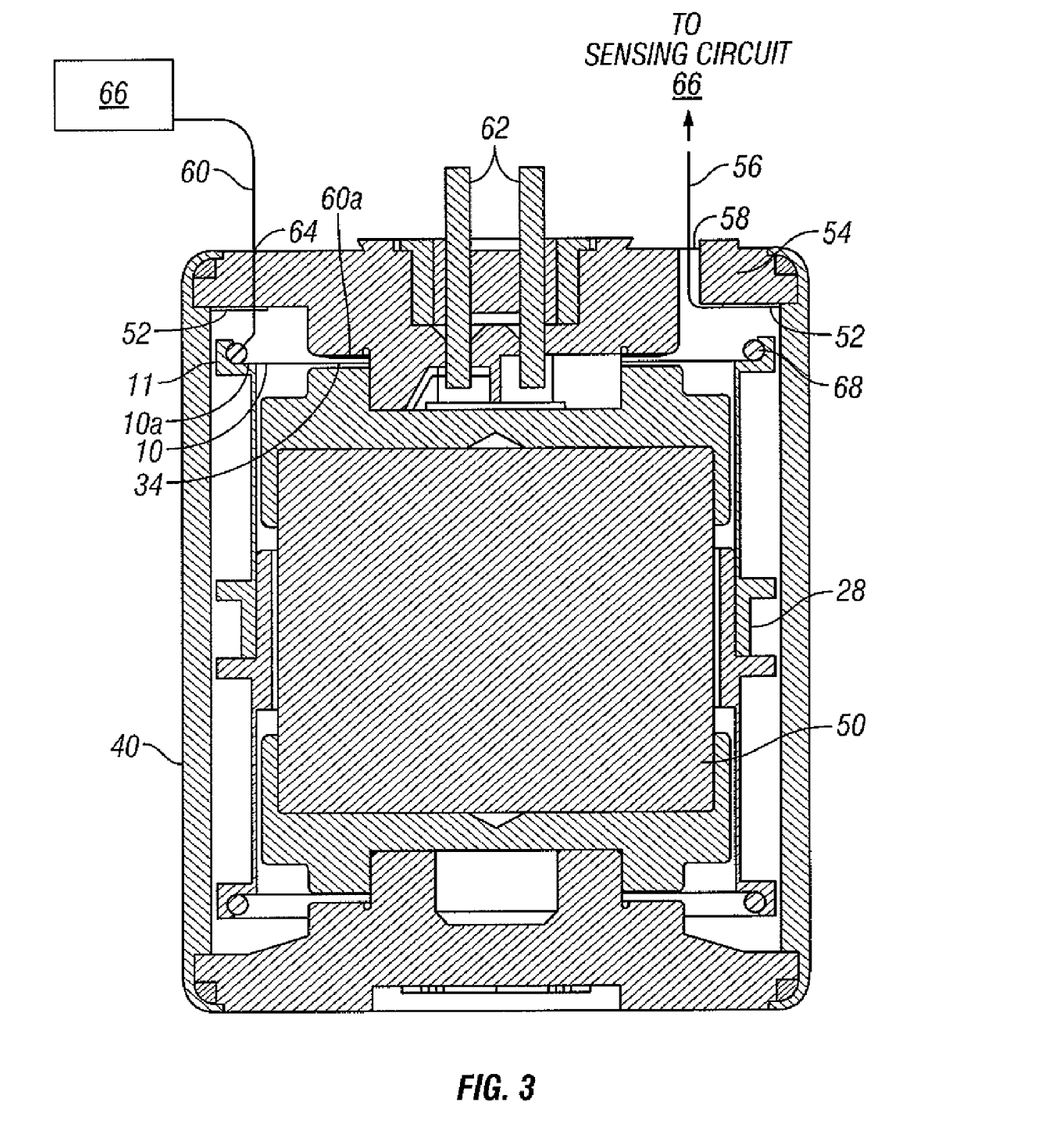
FIG. 3 illustrates one non-limiting example of a sensing element having a spring assembly that is used as a capacitor plate for estimating an inertial mass position.

FIG. 3 illustrates one non-limiting example of a sensing element having a spring assembly that is used as a capacitor plate for estimating an inertial mass position. In this case, the inertial mass comprises a coilform 28 also referred to a coil assembly 28. An electrically conductive capacitance plate 52 is coupled to an endplate 54 of the case or housing 40. An electrical conductor lead 56 is coupled to the capacitor plate 52, and the lead 56 exits the endplate 54 through an opening 58 formed therein.

Still referring to FIG. 3, one capacitance plate 52, is fixed just below, or formed on a surface of the endplate 54. A second capacitor plate is formed by the use of a spring assembly 10a. A spring assembly 10a according to several embodiments of the present disclosure includes a spring 10. The assembly 10a may further include an upper area 11 of the coil and/or a snap ring 68. A second electrical conductor lead 60 may be used to electrically couple the spring assembly 10a, either directly (as shown) or via an electrically conductive path 60a leading through the contact ring 34 to an output terminal 62 or may exit the case 40 via another route 64 as shown here. Alternatively, other configurations for conductive pathways, e.g. pigtail arrangements, may be used.

The spring assembly 10a or at least a portion thereof is electrically conductive according to several embodiments of the disclosure. The capacitor plate 52 may be disposed proximate the electrically conductive spring assembly 10a or assembly portion and separated therefrom by a distance, the distance being variable by relative movement of the coil assembly 28 and magnet 50. The plate and second capacitive plate form a variable capacitor when the leads are connected to a sensing circuit 66. Those skilled in the art would recognize and understand several sensing circuits capable of determining the distance between capacitor plates. Therefore, a detailed description and diagram of sensing circuit 66 are not provided here.

Figure 4:
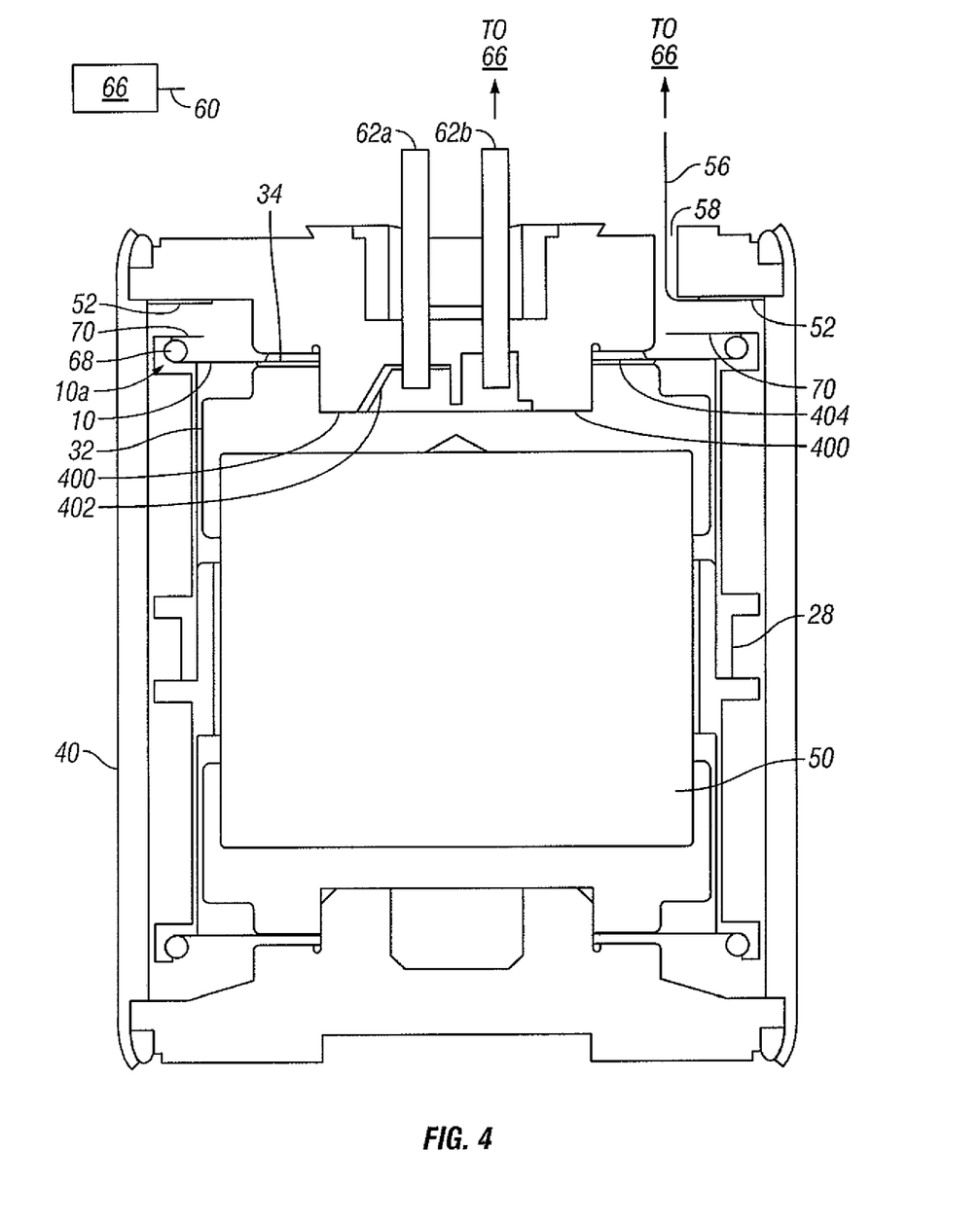
FIG. 4 illustrates a non-limiting example of a sensing element having an extended capacity plate and a spring assembly that are used as a capacitor plate for estimating an inertial mass position.
Figure 8:
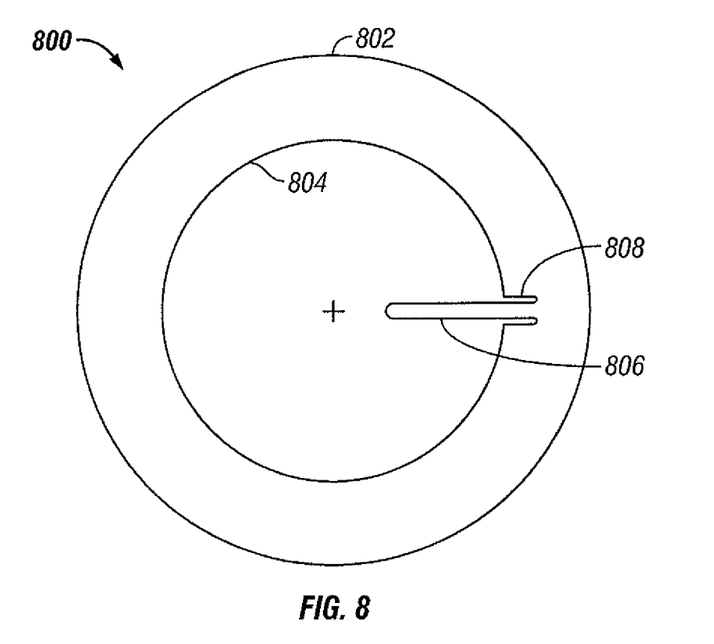
FIG. 8 illustrates a non-limiting example of a cap electrode that may be used in the several illustrative sensing elements described in the present disclosure.

FIG. 4 illustrates a non-limiting example of a sensing element having an extended capacity plate and a spring assembly that are used as a capacitor plate for estimating an inertial mass position. The embodiment of FIG. 4 is substantially similar to the embodiment described above and shown in FIG. 3. The embodiment of FIG. 4 provides an extended capacity plate 70, which may be formed by an electrically conductive plate positioned on the peripheral edge of an upper end of the coil assembly 28. An electrically conductive capacitor plate 52 is coupled to an endplate 54 of the case or housing 40. An electrical conductor lead 56 is coupled to the capacitor plate 52, and the lead 56 exits the endplate 54 through an opening 58 formed therein. The lead 56 and plate 52 may be formed in a monolithic manner as shown in FIG. 8, or the lead 56 and plate 52 may be connected during assembly using any suitable technique such as by soldering or press fit.

The capacitor plate 52, may be fixed just below, or formed on a surface of the endplate 54. A second capacitor plate may be formed by the use of the spring assembly 10a, and the extended capacity plate 70. The extended capacity plate 70 is electrically coupled, e.g. by soldering or press fit, to the spring assembly to provide an increase in effective surface area for a moveable electrode. A second electrical conductor lead 60 may be electrically coupled to the spring assembly 10a or to the extended capacity plate 70 either directly or via an electrically conductive path formed by several components, pin 62b coupled to spring contact 34, spring 10, snap ring 68 and/or coil assembly 28.

The spring assembly 10a or at least a portion thereof is electrically conductive and is electrically coupled to the extended capacity plate 70 to increase the area of the overall capacitor plate formed thereby. The endplate capacitor plate 52 may be disposed proximate the electrically conductive spring 10 and extended capacity plate 70 and separated therefrom by a distance, the distance being variable by relative movement of the coil assembly 28 and magnet 50. The plate 52, spring assembly 10a and extended capacity plate 70 form a variable capacitor when the leads are connected to a sensing circuit 66. Shown is an electrical path from the spring 10 to an output terminal 62a through a pole piece contact 400 and terminal lead 402. An insulating ring 404 may be used to electrically insulate the pole piece 32 and spring 10. Those skilled in the art would recognize and understand several sensing circuits capable of determining the distance between capacitor plates. Therefore, a detailed description and diagram of sensing circuit 66 are not provided here.

The extended capacity plate 70 may be electrically coupled to the spring electrode and mechanically coupled to the coil assembly 28. In this manner the extended capacity plate 70 forms a portion of the spring electrode by extending the available surface area of the spring electrode without affecting the mechanical properties of the spring 10. The extended capacity plate 70 may be shaped to allow for more spring movement without contacting the extended capacity plate 70. One possible extended capacity plate 70 arrangement is described below and shown in FIG. 9

Figure 5:
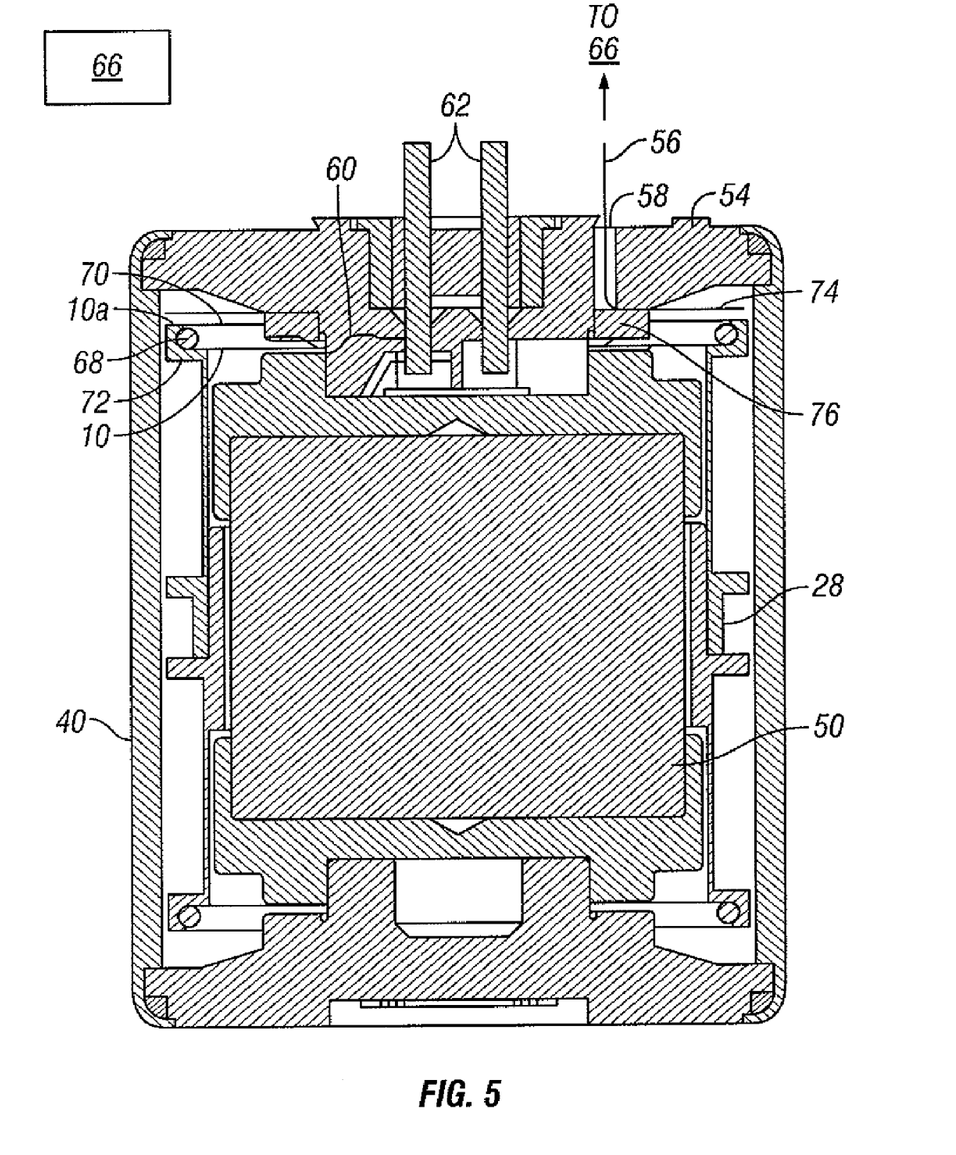
FIG. 5 illustrates another non-limiting example of a sensing element wherein a top capacitor plate is positioned closer to a spring assembly used as a capacitor plate.

FIG. 5 illustrates another non-limiting example of a sensing element wherein a top capacitor plate is positioned closer to a spring assembly used as a capacitor plate. Shown is a motion sensing element substantially similar to those described above and shown in FIGS. 2-4. In the present embodiment a fixed (stationary) capacitance plate 74 is mounted closer to the moving capacitor electrode formed by the spring 10 and extended capacity plate 70. This arrangement provides a larger capacitance and capacitance fluctuation with movement. Such an arrangement is useful for a force-feedback geophone or other motion-sensing element with force-feedback capability.

Still referring to FIG. 5, the fixed plate comprises an electrically conductive plate 74 coupled to the endplate 54 via a case bottom support ring 76. The case capacitor plate 74 extends from the bottom support ring 76 toward the case 40 side. An electrical conductor lead 56 is coupled to the capacitor plate 74, and the lead 56 exits the endplate 54 through an opening 58 formed therein.

A second capacitor plate is formed by the use of the spring assembly 10a, and the extended capacity plate 70. A second electrical conductor lead 60 is electrically coupled to the spring assembly 10a or to the extended capacity plate 70 either directly (as shown) or via an electrically conductive path through the coil assembly 28. The second lead 60 may be connected to an output terminal 62 or may exit the case 40 via another route.

The extended capacity plate 70 is electrically coupled to the spring assembly 10a to increase the area of the overall capacitor plate formed thereby. The endplate capacitor plate 74 is disposed proximate the electrically conductive spring assembly 10a and extended capacity plate 70 and is separated therefrom by a distance, the distance being variable by relative movement of the coil assembly 28 and magnet 50. The endplate capacitor plate 74, spring assembly 10a and extended capacity plate 70 form a variable capacitor. The lead 56 may be connected to the sensing circuit 66 as discussed above.

Figure 6:
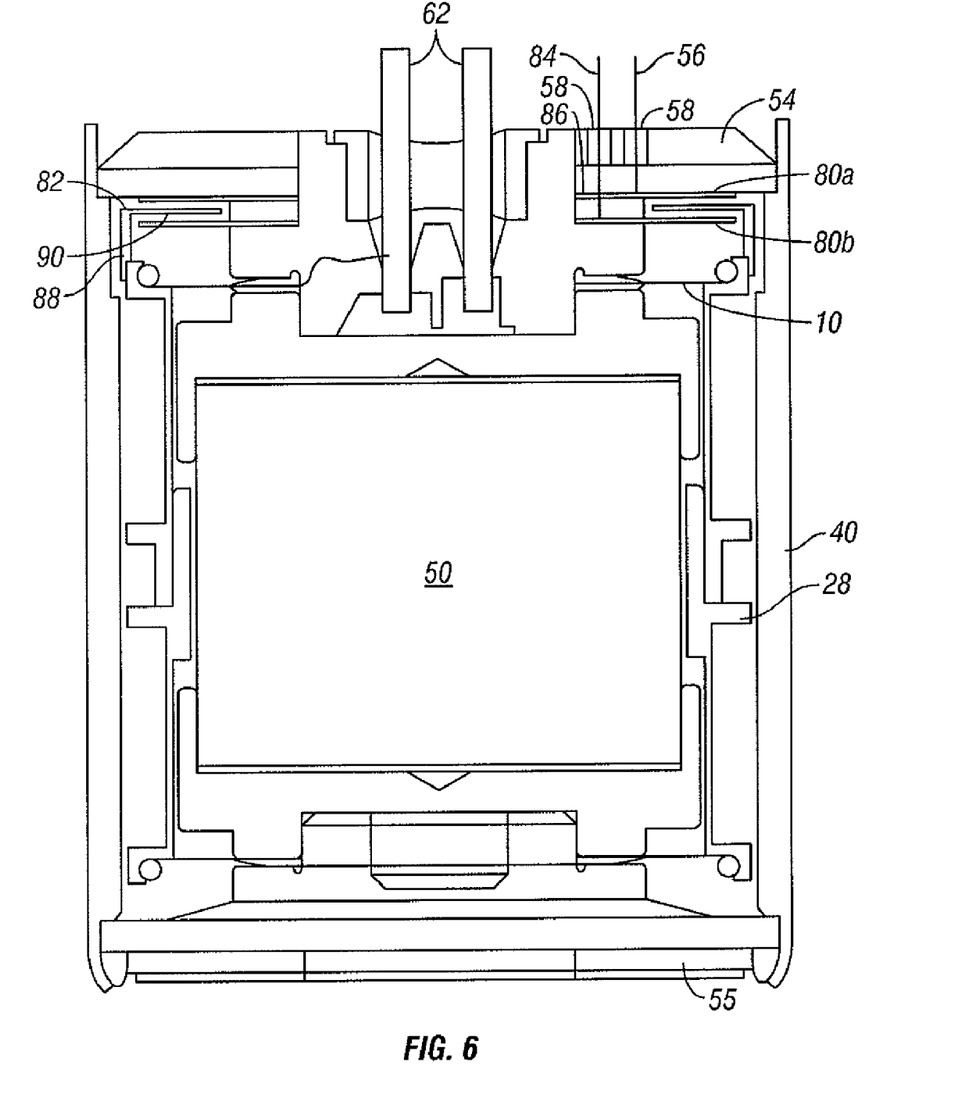
FIG. 6 illustrates a non-limiting example of a sensing element having two stationary capacitor plates positioned on opposite sides of a moving electrode.

FIG. 6 illustrates a non-limiting example of a sensing element having two stationary capacitor plates positioned on opposite sides of a moving electrode. In the example shown, two parallel stationary capacitor plates 80a, 80b are disposed about a moveable coil assembly capacitor plate 82. The stationary capacitor plates are electrically isolated from each other. One stationary capacitor plate 80a (upper capacitor plate) is coupled to, or formed on the endplate 54. An electrically conductive lead 56 is connected to the upper capacitor plate 80a and exits the housing 40 through the endplate 54 via an opening 58. A second electrically conductive lead 84 is connected to the second stationary capacitor plate 80b (the lower capacitor plate). The second lead 84 passes through the upper capacitor plate through an opening 86 formed therein. The second lead 84 then exits the housing 40 via an opening 58 formed in the endplate 54.

A coil assembly 28 substantially as described earlier is disposed within the housing 40. The moveable capacitor plate 82 is coupled to an end of the coil assembly 28. The moveable capacitor plate 82 may be formed from a single piece of conductive metal, which may be a metal alloy such as beryllium copper. The plate 82 includes a generally cylindrical piece 88 that is coupled to an end of the coil assembly 28. The moveable capacitor plate 82 further includes a shoulder 90, which fits between the upper stationary capacitor plate 80a and the lower stationary capacitor plate 80b. In this manner, the upper stationary capacitor plate 80a and the moveable capacitor plate 82 form a first variable capacitor and the lower stationary capacitor plate 80b and the moveable capacitor plate 82 form a second variable capacitor.

Figure 7:
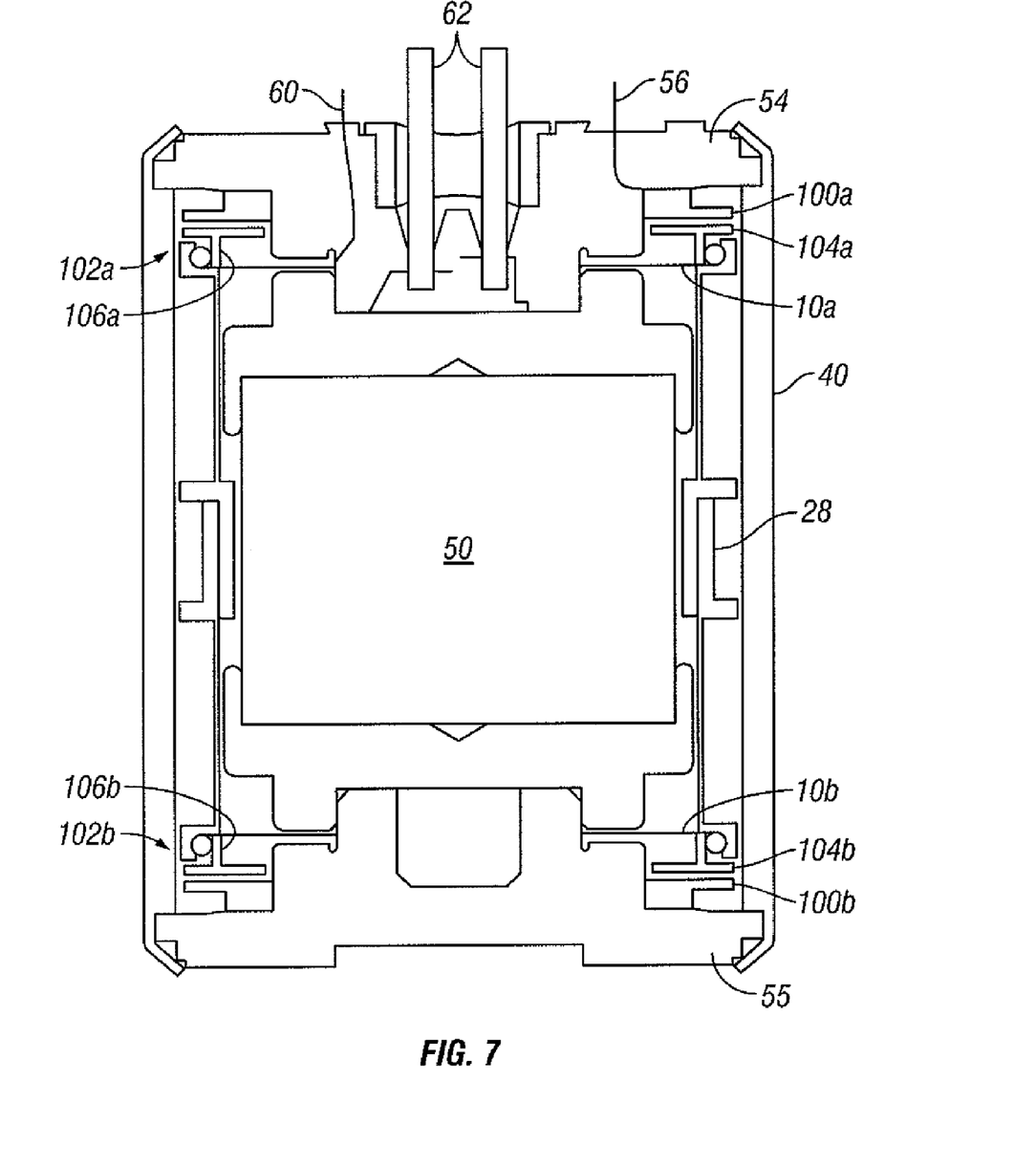
FIG. 7 illustrates yet another non-limiting example of a sensing element having a first variable capacitor formed by a top end cap capacitor plate and a top spring assembly and a second variable capacitor formed by a bottom end cap capacitor plate and a bottom spring assembly.

FIG. 7 illustrates yet another non-limiting example of a sensing element having a first variable capacitor formed by a top end cap capacitor plate and a top spring assembly and a second variable capacitor formed by a bottom end cap capacitor plate and a bottom spring assembly. Shown is a geophone substantially as described above and shown in FIGS. 2-6. Many of the details already described above are not shown or described here for brevity. Suffice it to say that the leads 56 and 60, their pathways to the exterior of the geophone housing 40 and the connection to a sensing circuit 66 can be readily implemented in this embodiment and all variations are considered part of this embodiment without further illustration.

Shown is an upper stationary capacitor plate 100a coupled to, or formed on, an upper endplate 54. A lower stationary capacitor plate 100b is coupled to, or formed on, a lower endplate 55. A moveable upper capacitor plate 102a is formed by the conductive components of the upper spring 10a, the upper areas of the coil assembly and/or the snap ring. A moveable lower capacitor plate 102b is formed by the conductive components of the lower spring assembly 10b, the lower areas of the coil assembly and/or the snap ring. Appropriate leads connecting the upper and lower variable capacitors to a sensing circuit are not shown, but are nonetheless considered as part of the embodiment.

Optional extended capacity plates 104a, 104b may be added to provide greater sensing capability as does the plate 70 described above. Also shown are standoff members 106a and 106b, which bring the respective moveable plate 104a, 104b closer to its respective stationary plate 100a, 100b. The extended capacity plates 104a, 104b and standoff members may be a unitary component formed as an annular member electrically connected to the respective spring assembly 10a, 10b.

FIG. 8 illustrates a non-limiting example of a cap electrode that may be used in the several illustrative sensing elements described in the present disclosure. For example, the plate 800 may be used as a fixed electrode 52 as shown in FIG. 4. The plate 800 may be formed from a single piece of metal or metal alloy, e.g. beryllium copper suitable for use as an electrode. The plate 800 is a generally circular plate having an outer perimeter 802 and an inner perimeter 804. The inner perimeter 804 includes a contact 806, which extends inwardly toward a central origin of the plate 800. The contact 806 has a base 808, which may be formed toward an interior of the plate 800 as shown or may be positioned substantially at the inner perimeter 804. As can be seen in FIG. 4, the contact is pliant to allow for bending the contact such that, when installed in the sensor element, the contact 806 may exit the sensor element endplate 54 through opening 58 to form lead 56. Without further illustration, those skilled in the art with the benefit of the present disclosure will recognize that an alternative contact arrangement may include forming the contact 806 as part of the outer perimeter 802 and extending outward.

Figure 9:
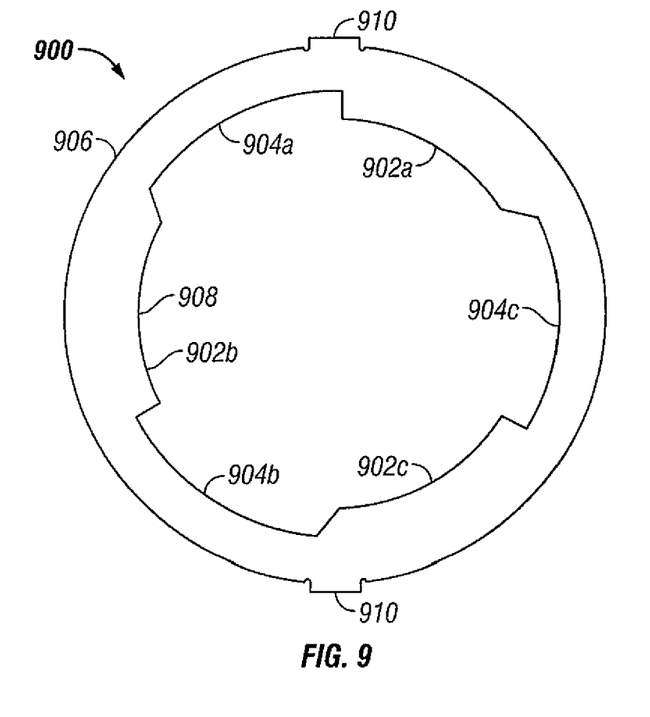
FIG. 9 illustrates a non-limiting example of an extended capacity electrode that may be used in the several illustrative sensing elements described in the present disclosure.

FIG. 9 illustrates a non-limiting example of an extended capacity electrode that may be used in the several illustrative sensing elements described in the present disclosure. For example, the plate 900 may be used to serve as an extended capacity plate, an example of which is extended capacity plate 70 described above and shown in FIG. 4, to allow for more movement of the spring 10 without contacting the plate 900. The plate 900 may be formed from a single piece of metal or metal alloy, e.g. beryllium copper suitable for use as an electrode. The plate 900 is a generally circular plate having an outer perimeter 906 and an inner perimeter 908. The outer perimeter may include one or more keys 910 for securing the plate 900 to the upper portion 11 of a coil assembly 28. Electrical contact between the plate 900 and the spring assembly 10*a* may be accomplished by any available method such as soldering or press contact. The plate 900 inner perimeter is contoured to allow for extended axial movement of the spring 10, when the spring 10 is non-circular, for example delta-shaped. Otherwise, the inner perimeter 908 may be substantially circular. The inner perimeter contour may include a plurality of extension members 902*a*, 902*b* and 902*c* and a plurality of slots 904*a*, 904*b*, and 904*c*. When installed in the sensor element the slots are aligned with the legs 18 of spring 10. The present disclosure contemplates various spring shapes, and includes a plate 900 having symmetry complementary to that of the selected spring to maximize the capacity plate area available for the sensing circuit without making contact between the spring and plate.

Figure 10:
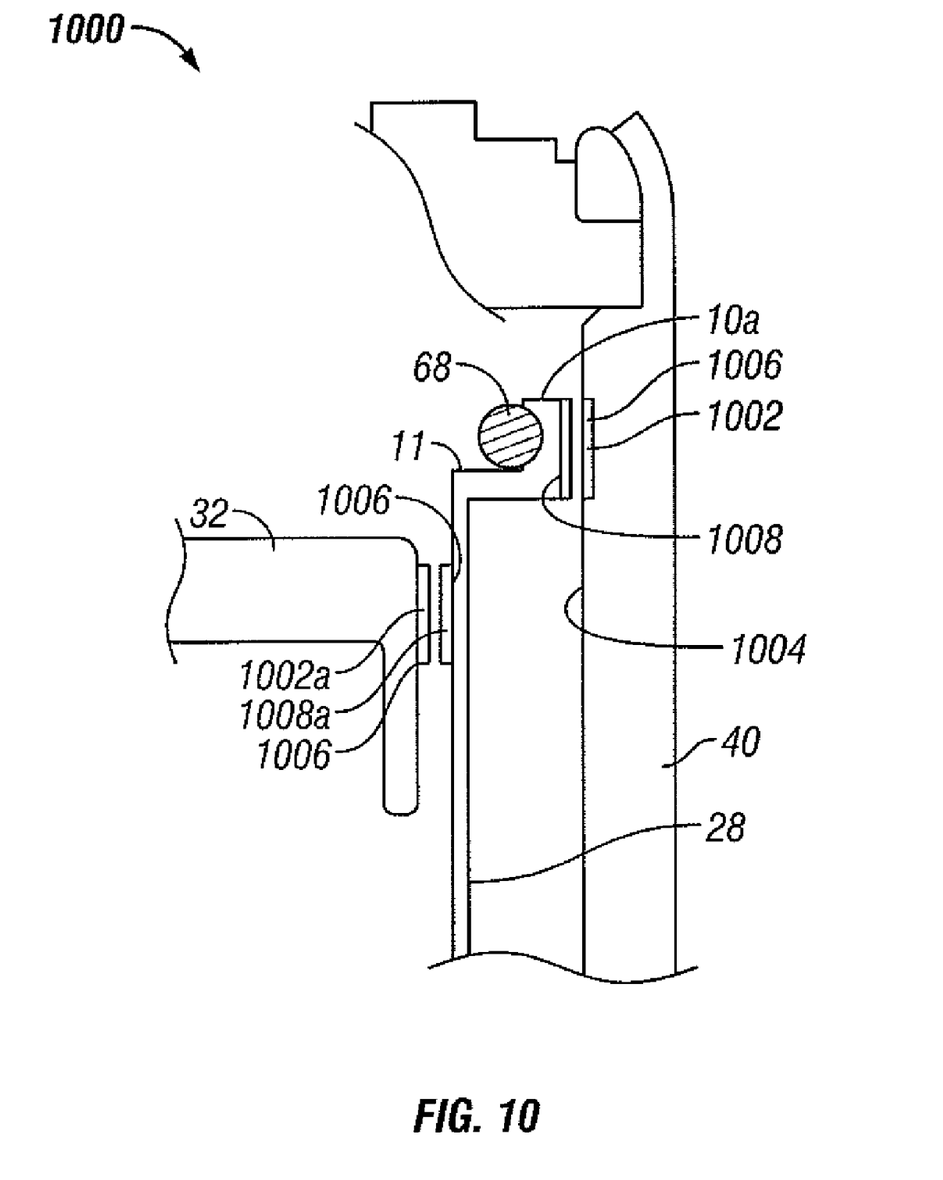
FIG. 10 illustrates a non-limiting example of a sensing element and shows alternative arrangements of capacitor plates.

FIG. 10 illustrates a non-limiting example of a sensing element and shows alternative arrangements of capacitor plates. Shown is a portion of a geophone sensor element 1000. The geophone sensor element 1000 and its elements are substantially as described above and shown in FIGS. 1 through 7 with the exception of the electrode configuration. Rather than using a variable distance between electrodes, the embodiment of FIG. 10 utilizes a variable plate area common between the electrodes while keeping the distance between the electrodes constant.

An electrically conductive capacitance plate or outer ring electrode 1002 is disposed on an inner surface 1004 of the case or housing 40. An insulator 1006, e.g. glass or other material having sufficient electrical insulation properties may be disposed between the plate 1002 and housing 40. An electrical conductor lead (not shown) may be used to connect the plate 1002 to a terminal (FIG. 3, 62*b*) or directly to a sensing circuit (FIG. 3, 66).

A second capacitor plate or ring electrode 1008 is formed or disposed on the spring assembly 10*a*. In particular, on a portion of an upper area 11 of the coil and/or a snap ring 68. A second electrical conductor lead or path (see FIG. 3, 60 or 60*a*) may be used to electrically couple the electrode 1008 to an output terminal (FIG. 3, 62*a*) or may exit the case 40 via another route for connecting to the sensing circuit 66.

The inner ring electrode plane and outer ring electrode plane are each oriented parallel to one another and to the sensor vertical axis. The ring electrodes are disposed such that the electrodes are aligned with one another with respect to the respective surface areas, including any compensation for spring performing. The distance between the plates is very small, in the order of 0.2 mm. The surface area relates to the periphery of the coil and is in the order of 70 mm. In operation, the coil shift may be approximately 2 mm. With this 2 mm movement the surface will change from nearly zero to about 140 mm$^2$. Such a change in overlapping or common surface area will thus be easily measurable by circuit 66 for determining the change in capacitance of the electrodes. The measured change in capacitance is then used to determine the relative position of the coil assembly and magnet as in other examples disclosed herein.

FIG. 10 is further used here to illustrate an alternate ring electrode arrangement. Rather than having ring electrodes 1002 and 1008 disposed respectively on the inner surface 1004 of case 40 and on the upper portion 11 of coil assembly 28, the ring electrodes indicated at 1002*a* and 1008*a* may be disposed respectively on the magnet pole piece 32 and inner portion of the coil assembly 28. Otherwise, the embodiment is substantially as shown in FIG. 10 with the variation in overlapping surface areas of the two electrodes being used as a variable capacitor. Those skilled in the art would recognize that an insulator 1006 may be necessary between an electrode 1002*a*, 1008*a* and its base 32, 28 as needed.

Several non-limiting operational examples of a method of sensing the position of an inertial mass in a sensing element are evident from the above descriptions of various sensing element examples.

In one operational example, a sensing element includes a case, a magnet positioned within the case, a spring assembly including an electrically conductive member, and a coil assembly coupled to the spring assembly. As described above, the coil assembly and magnet are moveable with respect to one another via the spring assembly. A capacitor plate is disposed proximate the electrically conductive member and separated therefrom by a distance. A method of estimating the relative position of the magnet and coil assembly might then include moving the coil assembly with respect to the magnet to vary the distance between the capacitor plate and the electrically conductive member, sensing an electrical capacitance formed by the capacitor plate and the electrically conductive member, and estimating a position of the coil assembly with respect to the magnet using the sensed capacitance.

In one particular embodiment a method of estimating the relative position of magnet and coil assembly in a motion sensing element includes increasing an effective surface area of the electrically conductive member using an extended capacity plate electrically coupled to the electrically conductive member.

In another particular embodiment, a method of estimating the relative position of a magnet and coil assembly in a motion sensing element having first and second variable capacitors includes sensing the electrical capacitance of the first variable capacitor and sensing the electrical capacitance of the second variable capacitor, and estimating a position of the inertial mass (magnet) with respect to the coil assembly using the sensed electrical capacitance Those skilled in the art would recognize that geophones need not be formed using a magnet coupled to the housing while the coil assembly is moveable with respect to the housing as described and shown here. Having the magnet being moveable with respect to the housing and coil assembly would generally accomplish the same function.

Thus far, embodiments include a moveable electrode formed by the conductive components of a geophone suspension spring, the upper areas of a coil assembly and/or a snap ring with the optional use of an extended capacity plate. The several embodiments described above include various conductor routes leading from the moveable electrode to a sensing circuit. It should be understood that other embodiments are likewise within is the scope of the disclosure.

The geophones described herein fall within a class of geophones known as rotating coil geophones. Those skilled in the art and with the benefit of this disclosure would recognize that the several embodiments may be implemented in pigtail geophones without further illustration or discussion here. A pigtail geophone includes a conductive path comprising a thin spirally-wound wire leading from the coil assembly to the terminals.

The foregoing description is directed to particular embodiments of the present invention for the purpose of illustration and explanation. It will be apparent, however, to one skilled in the art that many modifications and changes to the embodiment set forth above are possible without departing from the scope of the invention and the following claims.

What is claimed is:

1. A sensing element with position sensing, said sensing element comprising:
   a) a case
   b) a magnet positioned within the case;
   c) a spring assembly including an electrically conductive member;
   d) a coil assembly coupled to the spring assembly, the coil assembly and magnet being moveable with respect to one another via the spring assembly; and
   e) a capacitor plate disposed proximate the electrically conductive member and separated therefrom by a distance, the distance being variable by respective movement of the magnet and the coil assembly, the capacitor plate and electrically conductive member being each adapted for electrical connection to a sensing circuit for sensing an electrical capacitance formed by the capacitor plate and the electrically conductive member, the electrical capacitance being used for estimating a position of the coil assembly with respect to the magnet.

2. The sensing element of claim 1, wherein the electrically conductive member comprises an extended capacity plate electrically coupled to the electrically conductive member for increasing an effective surface area of the electrically conductive member.

3. The sensing element of claim 1, wherein the spring assembly includes a spring having an outer ring, the electrically conductive member comprises a portion of the outer ring.

4. The sensing element of claim 1, wherein the spring assembly comprises a first spring assembly positioned on a first coil assembly end and a second spring assembly positioned on a second coil assembly end, each spring assembly having a respective electrically conductive portion, the capacitor plate including a first capacitor plate and a second capacitor plate associated with a respective one of the first spring assembly and the second spring assembly, wherein the second capacitor plate and second spring assembly electrically conductive portion being each adapted for electrical connection to the sensing circuit for sensing an electrical capacitance formed by the second capacitor plate and the second electrically conductive portion.

5. The sensing element of claim 1 further comprising an endplate coupled to the case, the capacitor plate being disposed on the endplate.

6. The sensing element of claim 5, wherein the endplate comprises a support ring, the capacitor plate comprising an electrically conductive annular plate coupled to the endplate via the bottom ring, the annular plate extending outwardly from the bottom ring toward a side of the sensing element.

7. The sensing element of claim 1 further comprising:
   i) a top endplate coupled to one end of the case; and
   ii) a bottom endplate coupled to a second end of the case; wherein,
   the spring assembly comprises a first spring assembly and a second spring assembly,
   the magnet being coupled to the first spring assembly and to the second spring assembly at opposite ends of the magnet,
   the coil assembly being coupled to the first spring assembly and to the second spring assembly at opposite ends of the coil assembly,
   the capacitor plate comprises a first capacitor plate disposed on the top endplate proximate the first spring assembly and a second capacitor plate disposed on the bottom endplate proximate the second spring assembly, the first spring assembly and first capacitor plate forming a first variable capacitor and the second spring assembly and second capacitor plate forming a second variable capacitor.

8. The sensing element of claim 7, wherein the first spring assembly electrically conductive member and the second spring assembly electrically conductive member each includes an extended capacity plate electrically coupled to the respective electrically conductive member for increasing an effective surface area of the electrically conductive member.

9. A sensing element with position sensing, said sensing element comprising:
   a) a spring assembly having an outer ring, an inner ring and a plurality of legs connecting the outer ring and the inner ring, the spring assembly having an electrically conductive member;
   b) a magnet coupled to the spring assembly;
   c) a coil assembly coupled to the spring assembly, the coil assembly and magnet being moveable with respect to one another via the spring assembly;
   d) a first capacitor plate coupled to an end of the coil assembly proximate the spring assembly, the first capacitor plate having a top side and a bottom side;
   e) a second capacitor plate disposed on a case endplate and proximate the top side of the first capacitor plate and separated therefrom by a first distance;
   f) a third capacitor plate disposed on the case endplate and electrically isolated from the second capacitor plate, the third capacitor plate being proximate the bottom side of the first capacitor plate and separated therefrom by a second distance,
   wherein, the first distance and the second distance being variable by respective movement of the magnet and the coil assembly, the first capacitor plate, second capacitor plate and third capacitor plate being each adapted for electrical connection to a sensing circuit for sensing a first electrical capacitance formed by the first capacitor plate and the second capacitor plate and for sensing a second electrical capacitance formed by the first capacitor plate and the third capacitor plate.

10. A method of sensing the position of an inertial mass in a sensing element, said sensing element comprising, a case, a magnet positioned within the case, a spring assembly including an electrically conductive member, a coil assembly coupled to the spring assembly, the coil assembly and magnet being moveable with respect to one another via the spring assembly, a capacitor plate disposed proximate the electrically conductive member and separated therefrom by a distance, the method comprising:
   a) moving the coil assembly with respect to the magnet to vary the distance between the capacitor plate and the electrically conductive member;
   b) sensing an electrical capacitance formed by the capacitor plate and the electrically conductive member; and
   c) estimating a position of the coil assembly with respect to the magnet using the sensed capacitance.

11. The method of claim 10 further comprising increasing an effective surface area of the electrically conductive member using an extended capacity plate electrically coupled to the electrically conductive member.

12. The method of claim 10, wherein the spring assembly comprises a first spring assembly, the capacitor plate comprises a first capacitor plate, the coil assembly comprises a first end and a second end, the coil assembly being coupled to the first spring assembly at the coil assembly first end, the magnet comprises a first end and a second end, the magnet being coupled to the first spring assembly at the magnet first end, the sensing element further comprising a second spring assembly coupled to the magnet second end and to the coil assembly second end, the second spring assembly having an electrically conductive portion and a second capacitor plate disposed proximate the second spring assembly electrically conductive portion and separated therefrom by a distance, the method further comprising:

sensing a second electrical capacitance formed by the second capacitor plate and the second electrically conductive portion; and estimating a position of the inertial mass with respect to the coil assembly using the sensed electrical capacitance.

13. A sensing element with position sensing, said sensing element comprising:
   a) a case;
   b) a magnet positioned within the case;
   c) a spring assembly coupled to the magnet;
   d) a coil assembly coupled to the spring assembly, the coil assembly and magnet being moveable with respect to one another via the spring assembly;
   e) a first capacitor plate disposed on the coil assembly, the first capacitor plate having a first plate area; and
   f) a second capacitor plate coupled to the case, the second capacitor plate having a second plate area, wherein, the first capacitor plate and the second capacitor plate are spaced apart by a distance and having at least a portion of the first capacitor plate area and second capacitor plate area overlapping and wherein relative movement of the magnet and coil assembly causes the overlapping portion of first capacitor plate area and the second capacitor plate area to vary while the distance remains substantially constant, the varying overlapping plate areas creating a variable electrical capacitance used for estimating a position of the coil assembly with respect to the magnet.

14. A sensing element with position sensing, said sensing element comprising:
   a) a case;
   b) a magnet positioned within the case;
   c) a spring assembly coupled to the magnet;
   d) a coil assembly coupled to the spring assembly, the coil assembly and magnet being moveable with respect to one another via the spring assembly;
   e) a first capacitor plate disposed on the coil assembly, the first capacitor plate having a first plate area; and
   f) a second capacitor plate disposed on a pole piece of the magnet, the second capacitor plate having a second plate area, wherein, the first capacitor plate and the second capacitor plate are spaced apart by a distance and having at least a portion of the first capacitor plate area and second capacitor plate area overlapping and wherein relative movement of the magnet and coil assembly causes the overlapping portion of first capacitor plate area and the second capacitor plate area to vary while the distance remains substantially constant, the varying overlapping plate areas creating a variable electrical capacitance used for estimating a position of the coil assembly with respect to the magnet.

* * * * *